(12) United States Patent
Hirano et al.

(10) Patent No.: US 8,376,474 B2
(45) Date of Patent: Feb. 19, 2013

(54) VEHICLE BRAKING APPARATUS

(75) Inventors: Risa Hirano, Nagano (JP); Kouji Sakai, Nagano (JP); Hiromitsu Takizawa, Nagano (JP); Hideki Hidume, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 399 days.

(21) Appl. No.: 12/730,871

(22) Filed: Mar. 24, 2010

(65) Prior Publication Data

US 2010/0244551 A1   Sep. 30, 2010

(30) Foreign Application Priority Data

Mar. 26, 2009  (JP) .................. P.2009-76098

(51) Int. Cl.
*B60T 8/44* (2006.01)
(52) U.S. Cl. .................. 303/114.1; 303/113.3; 188/152; 188/359
(58) Field of Classification Search ............... 303/114.1, 303/20, 113.3; 188/152, 355, 358, 359; 60/547.1, 60/562, 563
See application file for complete search history.

(56) References Cited

U.S. PATENT DOCUMENTS

| 7,077,482 | B2 * | 7/2006 | Matsuno et al. | 303/114.1 |
| 2005/0039596 | A1 | 2/2005 | Krebs et al. | |
| 2005/0121973 | A1 | 6/2005 | Matsuno et al. | |
| 2005/0236890 | A1 | 10/2005 | Matsuno et al. | |
| 2010/0283315 | A1 * | 11/2010 | Isono | 303/9.75 |

FOREIGN PATENT DOCUMENTS

| DE | 102 03 411 | | 7/2003 |
| EP | 0 888 910 | | 1/1999 |
| EP | 1 538 048 | | 6/2005 |
| EP | 1 538 049 | | 6/2005 |
| FR | 2 653 575 | | 10/1990 |
| GB | 2004014 | | 9/1978 |
| JP | 2005162127 A | * | 6/2005 |
| JP | 2006-282012 | | 10/2006 |

OTHER PUBLICATIONS

European Search Report for corresponding European Application No. 10157751.8.

* cited by examiner

*Primary Examiner* — Pamela Rodriguez
(74) *Attorney, Agent, or Firm* — Andrew M. Calderon; Roberts Mlotkowski Safran & Cole, P.C.

(57) ABSTRACT

A vehicle braking apparatus includes: a control piston configured to operate so that a reaction force based on the fluid pressure of the boosted fluid pressure application chamber is balanced with a braking operation input from the brake operation member; an elastic member including: a first face adapted to contact with a simulator piston connected to the brake operation member and slidably accommodated in the control piston; and a second face; a sliding member adapted to contact with the second face, the sliding member being accommodated in the control piston; a spring disposed between the sliding member and the control piston; and an odd-shaped portion disposed on at least one of the first and second faces of the elastic member, the odd-shaped portion configured to increase a contacting area of the elastic member and at least one of the simulator piston and the sliding member.

20 Claims, 10 Drawing Sheets

VEHICLE BRAKING APPARATUS

BACKGROUND

1. Field of the Invention

The present invention relates to a vehicle braking apparatus being characterized in that between a brake operation member and a fluid pressure booster, having a cylindrical control piston operating so that the reaction force based on the fluid pressure of a boosted fluid pressure application chamber facing the rear face of a master piston disposed in a master cylinder is balanced with the braking operation input from the brake operation member, for adjusting the fluid pressure of a fluid pressure source depending on the operation of the control piston in the axial direction and for applying the fluid pressure to the boosted fluid pressure application chamber, a stroke simulator, including an elastic device formed of a cylindrical elastic member, one end of which is made contact with a simulator piston connected to the brake operation member and slidably accommodated in the control piston in the axial direction, a sliding member making contact with the other end of the elastic member and a spring disposed between the sliding member and the control piston, and accommodated in the control piston, is provided.

2. Description of the Related Art

JP-A-2006-282012 discloses a vehicle braking apparatus equipped with a stroke simulator in which an elastic device formed of an elastic member and a spring connected in series is disposed between the control piston of a fluid pressure booster and a brake operation member.

In the stroke simulator disclosed in JP-A-2006-282012 described above, the characteristic in the initial stage of the brake operation is generated by the elastic force of the spring and the stroke characteristic of the brake operation is then obtained by compressing the elastic member. However, since both end faces of the elastic member are formed into a flat face, the areas of the elastic member making contact with the sliding member and the simulator piston are unchanged in the initial stage of the stroke. Hence, an excessive difference occurs in characteristic in the transfer stage from the spring region to the elastic member region, and a feeling of strangeness is caused sometimes.

SUMMARY

In consideration of these circumstances, an object of the present invention is to provide a vehicle braking apparatus in which the feeling of the stroke in the initial stage is enhanced.

According to a first aspect of the invention, there is provided a vehicle braking apparatus, disposed between a brake operation member and a fluid pressure booster configured to apply a fluid pressure to a boosted fluid pressure application chamber, the vehicle braking apparatus including: a control piston having a cylindrical shape, the control piston configured to operate so that a reaction force based on the fluid pressure of the boosted fluid pressure application chamber is balanced with a braking operation input from the brake operation member, the boosted fluid pressure application chamber facing a rear face of a master piston disposed in a master cylinder; an elastic member having a cylindrical shape, the elastic member including: a first face adapted to contact with a simulator piston connected to the brake operation member and slidably accommodated in the control piston in an axial direction; and a second face; a sliding member adapted to contact with the second face, the sliding member being accommodated in the control piston; a spring disposed between the sliding member and the control piston; and an odd-shaped portion disposed on at least one of the first and second faces of the elastic member, the odd-shaped portion configured to increase a contacting area of the elastic member and at least one of the simulator piston and the sliding member.

According to a second aspect of the invention, the odd-shaped portion may include a protrusion portion and a flat face, and the protrusion portion may include at least one protrusion protruded from the flat face.

According to a third aspect of the invention, the protrusion portion may include a plurality of protrusions protruded from the flat face.

According to a fourth aspect of the invention, the odd-shaped portion may include a concave portion formed in the flat face around the protrusion.

According to a fifth aspect of the invention, the elastic member may be made of rubber.

According to the first to fifth aspects of the invention, the odd-shaped portion provided at least at one of both end portions of the elastic member in the axial direction increases its area making contact with at least one of the simulator piston and the sliding member as the elastic member is compressed in the axial direction. Hence, the characteristic in the initial stage by means of the stroke simulator can be changed as desired by the setting of the odd-shaped portion so that the transfer from the spring region to the elastic member region is carried out smoothly. As a result, the feeling of the braking operation stroke in the initial stage can be enhanced.

According to the second aspect of the invention, the characteristic in the initial stage can be changed easily by changing the shape of the protrusions.

According to the third aspect of the invention, the characteristic in the initial stage can be changed more easily by changing the number of the protrusions.

According to the fourth aspect of the invention, the distortions caused by the deformations of the protrusions can be reduced by relieving parts of the protrusions into the concave portions, and the operation feeling can be improved further.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
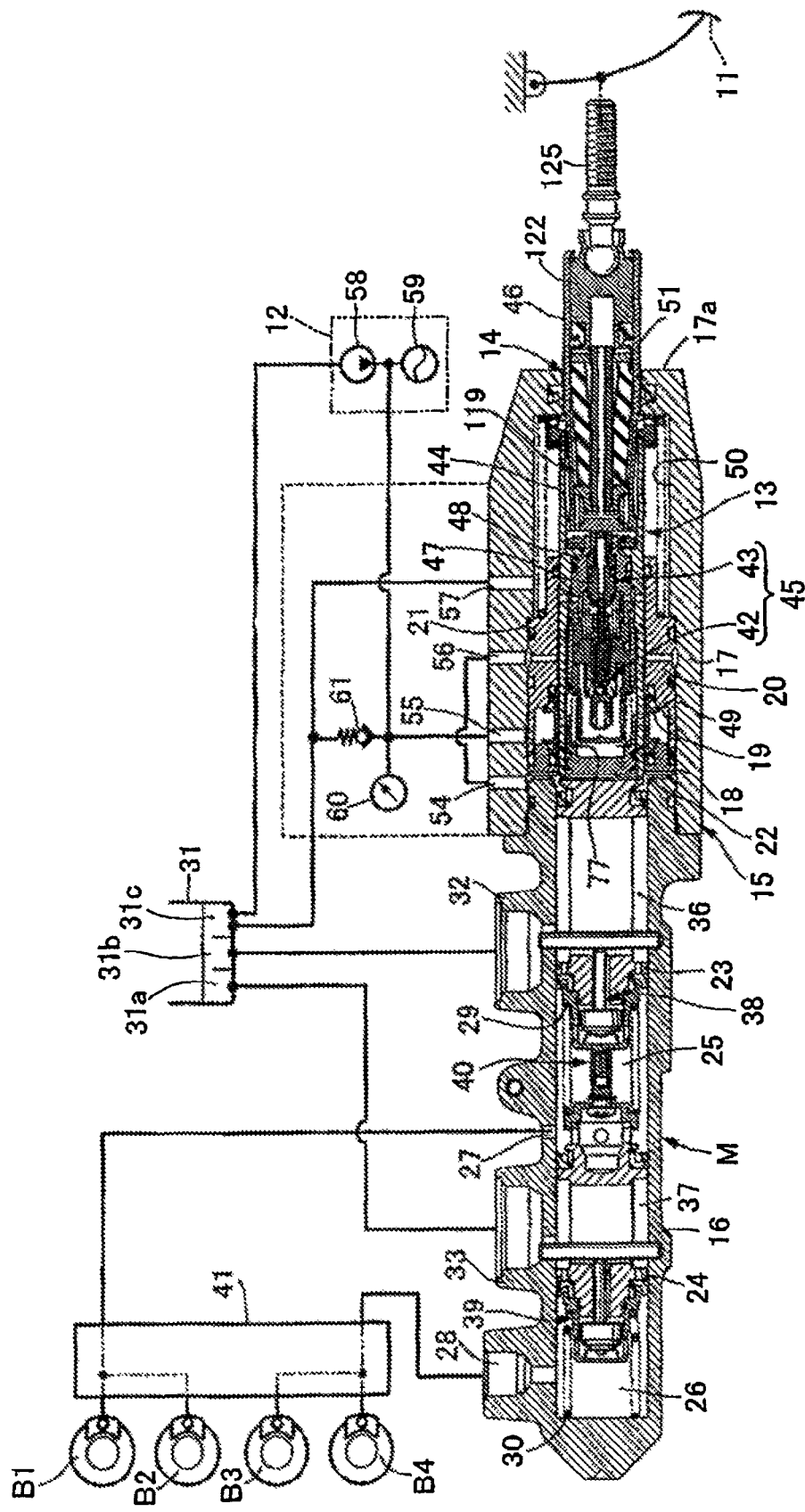
FIG. 1 is a brake fluid pressure system diagram showing the entire configuration of a vehicle braking apparatus according to one aspect of the invention.

Embodiments according to the present invention will be described below in detail on the basis of the accompanying drawings.

A first embodiment of the present invention will be described below referring to FIGS. 1 to 9. First, referring to FIG. 1, a braking apparatus for four-wheel vehicles is equipped with a tandem master cylinder M; a fluid pressure booster 13 for adjusting the fluid pressure of a fluid pressure source 12 depending on the brake operation force input from a brake pedal 11 (a brake operation member) serving as a braking operation member and for applying the fluid pressure to the master cylinder M; and a stroke simulator 14 disposed between the brake pedal 11 and the fluid pressure booster 13.

A casing 15 commonly used for both the master cylinder M and the fluid pressure booster 13 includes a cylindrical member 16 having a bottomed cylindrical shape and closed at its front end; a body 17 formed into a cylindrical shape having an inward flange portion 17a at its rear end and coaxially connected to the rear portion of the cylindrical member 16; a ring member 18 held between the rear end of the cylindrical member 16 and the body 17; a separator 19; and a sleeve 20. The rear end of the cylindrical member 16 is fluid-tightly fitted into the front portion of the body 17, the ring member 18 is fluid-tightly fitted into the body 17 and made contact with the rear end of the cylindrical member 16, the sleeve 20 is fitted into the front portion of the body 17 so that its retraction limit is restricted using a ring-shaped step portion 21 provided in the intermediate portion of the body 17 around its inner circumference, and the separator 19 is held between the ring member 18 and the sleeve 20.

The rear face of the master cylinder M faces a boosted fluid pressure application chamber 22, and a rear master piston 23 (a master piston) spring-biased backward is slidably fitted into the cylindrical member 16. A front master piston 24 disposed ahead of the rear master piston 23 while being spring-biased backward is slidably fitted into the cylindrical member 16. A rear output fluid pressure chamber 25 is formed between the rear master piston 23 and the front master piston 24, and a front output fluid pressure chamber 26 is formed between the front closed portion of the cylindrical member 16 and the front master piston 24.

The cylindrical member 16 is provided with a rear output port 27 communicating with the rear output fluid pressure chamber 25 and a front output port 28 communicating with the front output fluid pressure chamber 26. Furthermore, inside the rear output fluid pressure chamber 25, a rear return spring 29 for biasing the rear master piston 23 backward is disposed between the rear master piston 23 and the front master piston 24 in a compressed state. Inside the front output fluid pressure chamber 26, a front return spring 30 for biasing the front master piston 24 backward is disposed between the front closed end of the cylindrical member 16 and the front master piston 24 in a compressed state.

The master cylinder M is provided with a reservoir 31, and this reservoir 31 is formed so as to be partitioned into first, second and third fluid reserving chambers 31a, 31b and 31c.

Hence, a rear connection cylinder portion 32 having a cylindrical shape and communicating with the second fluid reserving chamber 31b and a front connection cylinder portion 33 having a cylindrical shape and communicating with the first fluid reserving chamber 31a are provided so as to be integrated with the cylindrical member 16 while protruding upward at positions spaced in the direction of the axial line.

A rear replenishing fluid chamber 36 communicating with the interior of the rear connection cylinder portion 32 is formed into a ring shape between the outer circumference of the rear master piston 23 and the inner face of the cylindrical member 16, and the brake fluid replenished from the second fluid reserving chamber 31b of the reservoir 31 is supplied to the rear replenishing fluid chamber 36. In addition, a front replenishing fluid chamber 37 communicating with the interior of the front connection cylinder portion 33 is formed into a ring shape between the outer circumference of the front master piston 24 and the inner face of the cylindrical member 16, and the brake fluid replenished from the first fluid reserving chamber 31a of the reservoir 31 is supplied to the front replenishing fluid chamber 37.

The rear master piston 23 is equipped with a conventionally known center valve 38 for establishing communication between the rear output fluid pressure chamber 25 and the rear replenishing fluid chamber 36 when the rear master piston 23 has returned to its retraction limit position. The front master piston 24 is equipped with a conventionally known center valve 39 for establishing communication between the front output fluid pressure chamber 26 and the front replenishing fluid chamber 37 when the front master piston 24 has returned to its retraction limit position.

In other words, the master cylinder M is configured as a center valve type in which the rear master piston 23 and the front master piston 24 are equipped with the center valves 38 and 39 that operate to open so as to replenish the brake fluid from the reservoir 31 to the rear and front output fluid pressure chambers 25 and 26 when the master pistons 23 and 24 retract. Furthermore, between the rear and front master pistons 23 and 24, a maximum distance regulator 40 for regulating the maximum distance between the master pistons 23 and 24 is provided.

The rear output port 27 of the master cylinder M is connected to a right front wheel brake B1 and a left rear wheel brake B2 via a fluid pressure modulator 41, and the front output port 28 is connected to a left front wheel brake B3 and a right rear wheel brake B4 via the fluid pressure modulator 41. The fluid pressure modulator 41 is a conventionally known device that controls the brake fluid pressure output from the rear and front output ports 27 and 28 as desired to carry out antilock brake control at the time of braking operation and to carry out automatic brake control, such as traction control, in a non-braking operation state.

Figure 2:
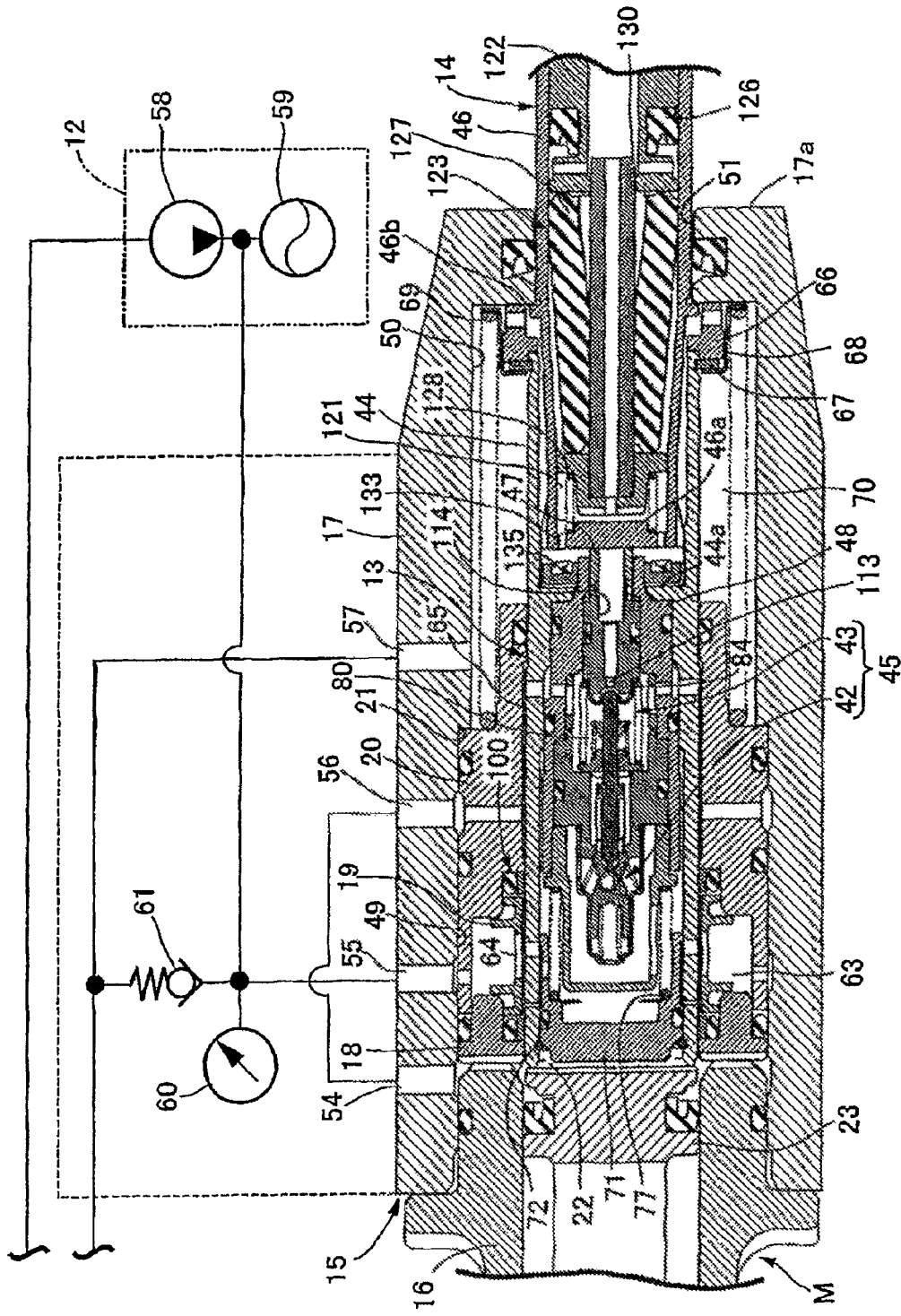
FIG. 2 is a vertical sectional view showing a part of a fluid pressure booster and a part of a stroke simulator.

In FIG. 2, the fluid pressure booster 13 is equipped with a cylindrical backup piston 44 accommodated in the casing 15 while its front end faces the boosted fluid pressure application chamber 22; a pressure regulator 45 including a boosting valve 42 and a reducing valve 43 and built into the backup piston 44; a control piston 46 operating to balance the reaction force based on the fluid pressure of the boosted fluid pressure application chamber 22 with the braking operation input from the brake pedal 11 and to enable the pressure regulator 45 to perform pressure adjustment; a first reaction force piston 47 disposed between the pressure regulator 45 and the control piston 46 so as to exert the reaction force based on the fluid pressure of the boosted fluid pressure application chamber 22 to the control piston 46; and a second reaction force piston 48 disposed between the backup piston 44 and the first reaction force piston so as to exert the output fluid pressure of the fluid pressure source 12 and the reaction force from a reaction spring 77 in addition to the reaction force from the first reaction force piston 47 to the control piston 46 when the braking operation input from the brake pedal 11 has increased.

The body 17 constituting a part of the casing 15 and coaxially connected to the rear portion of the cylindrical member 16 is provided with a large diameter hole 49 into which the rear end of the cylindrical member 16, the ring member 18, the separator 19 and the sleeve 20 are fitted from the front end side thereof; and an intermediate diameter hole 50 having a diameter smaller than that of the large diameter hole 49 and coaxially connected to the rear end of the large diameter hole 49 while forming the ring-shaped step portion 21 between the rear end of the large diameter hole 49 and the intermediate diameter hole 50. The inward flange portion 17a provided at the rear end of the body 17 is provided with a small diameter hole 51 having a diameter smaller than that of the intermediate diameter hole 50 and formed so as to define the rear end of the intermediate diameter hole 50.

The ring member 18 and the sleeve 20 are fluid-tightly fitted into the large diameter hole 49 so as to be held between the rear end of the cylindrical member 16 and the step portion 21, while the separator having an inside diameter larger than the inside diameters of the ring member 18 and the sleeve 20 is held between the ring member 18 and the sleeve 20. The backup piston 44 is slidably fitted into the ring member 18 and the sleeve 20.

The body 17 is provided with a connection port 54 being open in the inner face of the large diameter hole 49 at the corresponding position between the cylindrical member 16 of the master cylinder M and the ring member 18 and communicating with the boosted fluid pressure application chamber 22; an input port 55 being open in the inner face of the large diameter hole 49 at the corresponding position between the ring member 18 and the sleeve 20; an output port 56 being open in the inner face of the large diameter hole 49 in the intermediate portion of the sleeve 20 in the axial direction thereof and connected to the connection port 54; and an open port 57 being open in the front inner face of the intermediate diameter hole 50, these ports being arranged in this order from the front end and spaced apart. The open port 57 is connected to the third fluid reserving chamber 31c of the reservoir 31.

The fluid pressure source 12 is connected to the input port 55. The fluid pressure source 12 is equipped with a pump 58 for pumping the brake fluid from the third fluid reserving chamber 31c of the reservoir 31 and an accumulator 59 connected to the discharge side of the pump 58. The operation of the pump 58 is controlled depending on the fluid pressure of the accumulator 59 detected using a fluid pressure sensor 60. The fluid pressure source 12 can output a high constant fluid pressure regardless of the operation of the brake pedal 11, and the fluid pressure output from the fluid pressure source 12 is supplied to the input port 55. In addition, a relief valve 61 is provided between the discharge side of the fluid pressure source 12 and the third fluid reserving chamber 31c of the reservoir 31. Hence, the fluid pressure path for connecting the input port 55 to the connection port 54 and the relief valve 61 are disposed on the body 17 of the casing 15. The fluid pressure sensor 60 is also disposed on the body 17.

The front portion of the backup piston 44 is fitted into the ring member 18 fluid-tightly and slidably, and the intermediate portion of the backup piston 44 is fitted into the sleeve 20 fluid-tightly and slidably. In addition, in the region where the separator 19 is held between the ring member 18 and the sleeve 20, and between the ring member 18 and the sleeve 20 of the casing 15 and the outer circumference of the backup piston 44, an input-side ring-shaped chamber 63 sealed fluid-tightly from the boosted fluid pressure application chamber 22 is formed so as to communicate with the input port 55. The separator 19 disposed inside the input-side ring-shaped chamber 63 is provided with a plurality of through holes 64 so as not to divide the input-side ring-shaped chamber 63. Furthermore, an output-side ring-shaped chamber 65 sealed fluid-tightly from the input-side ring-shaped chamber 63 is formed between the inner circumference of the sleeve 20 and the backup piston 44 so as to communicate with the output port 56.

A ring-shaped stopper 66 is made contact with the inward flange portion 17a of the body 17. A coil spring 69 surrounding the rear half of the backup piston 44 is provided in a compressed state between the sleeve 20 and a retainer 68, the front side of which is made contact with and engaged with a retaining ring 67 mounted on the outer circumference of the rear end portion of the backup piston 44. The backup piston 44 is spring-biased backward by the spring force of this spring 69. Hence, the position where the retaining ring 67 is made contact with the stopper 66 making contact with the inward flange portion 17a of the body 17 is defined as the retraction limit of the backup piston 44. The front end of the backup piston 44 located at the retraction limit faces the boosted fluid pressure application chamber 22 and makes contact with the entire circumference of the outer circumferential fringe portion on the rear face of the rear master piston 23 being in its non-operation state, and the rear master piston 23 being in this state is also located at its retraction limit.

Between the sleeve 20 and the inward flange portion 17a inside the body 17, an open chamber 70 surrounding the backup piston 44 so as to accommodate the spring 69 is formed so as to be fluid-tightly sealed from the output-side ring-shaped chamber 65.

An inward flange portion 44a extending inward in the radial direction is integrally provided on the inner face of the axial intermediate portion of the backup piston 44. The second reaction piston 48 having a stepped cylindrical shape is slidably fitted into the backup piston 44 ahead of the inward flange portion 44a. The first reaction force piston 47 is fitted into the second reaction force piston 48 so as to be coaxial and mutually slidable.

Figure 3:
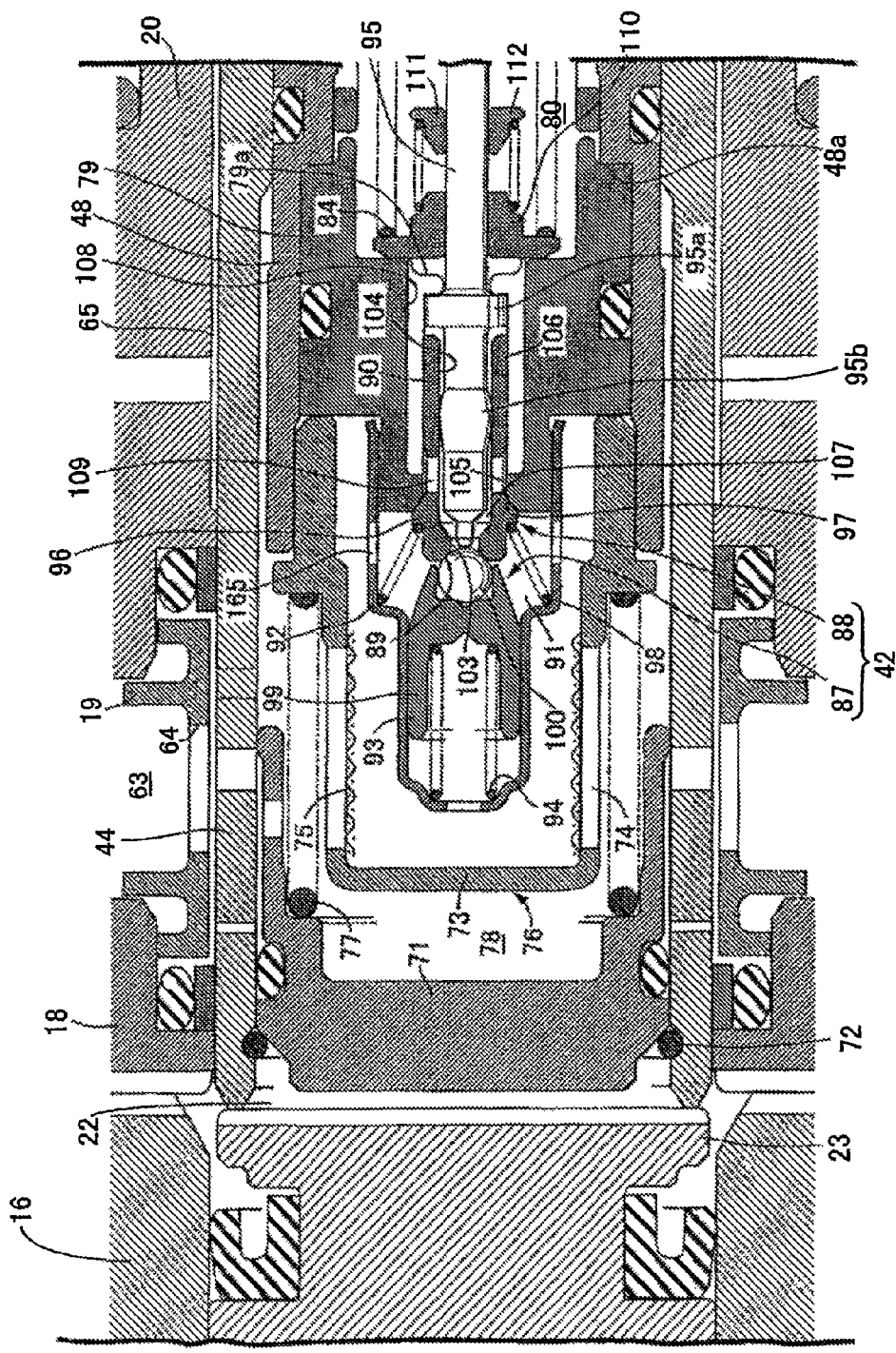
FIG. 3 is an enlarged vertical sectional view showing a region near a boosting valve in the fluid pressure booster.

Referring to FIG. 3, an end wall member 71, the front face of which faces the boosted fluid pressure application chamber 22, is fluid-tightly fitted into the front end portion of the backup piston 44. A retaining ring 72 making contact with and engaging with the outer circumferential fringe portion of this end wall member 71 from the front side is mounted on the inner circumference of the front end portion of the backup piston 44. Furthermore, the rear portion of a filter frame 73 formed into a bottomed cylindrical shape and having a plurality of openings 74 in the circumferential direction thereof is press-fitted into the front end of the second reaction force piston 48. A mesh member 75 is provided on the inner face of the filter frame 73 to form a filter 76. The second reaction force piston 48 is biased from the front side to the side making contact with the inward flange portion 44a of the backup piston 44 by the spring force of the reaction spring 77 disposed between this filter 76 and the end wall member 71 in a compressed state.

An input chamber 78 is formed inside the backup piston 44 between the end wall member 71 and the second reaction force piston 48 and the filter 76. This input chamber 78 communicates with the input-side ring-shaped chamber 63. In other words, the high-pressure brake fluid from the fluid pressure source 12 is introduced to the input chamber 78.

A ring-shaped step portion 48a facing forward is provided on the inner face of the intermediate portion of the second reaction force piston 48. A valve seat member 79 having a stepped cylindrical shape and fluid-tightly fitted into the second reaction force piston 48 is fitted so as to make contact with the step portion 48a. The valve seat member 79 is thus held between the step portion 48a and the rear end of the filter frame 73 that is press-fitted into the front end of the second reaction force piston 48. Hence, the valve seat member 79 is fluid-tightly fitted into the front portion of the second reaction force piston 48 and fixed thereto, thereby being supported by the backup piston 44 via the second reaction force piston 48.

On the other hand, as shown in FIG. 2, the first reaction force piston 47 is fitted fluid-tightly and slidably into the rear portion of the second reaction force piston 48. A pressure adjustment chamber 80 facing the rear face of the valve seat member 79 and facing the front end of the first reaction force piston 47 is formed inside the second reaction force piston 48. The pressure adjustment chamber 80 communicates with the output-side ring-shaped chamber 65, i.e., the output port 56.

Figure 4:
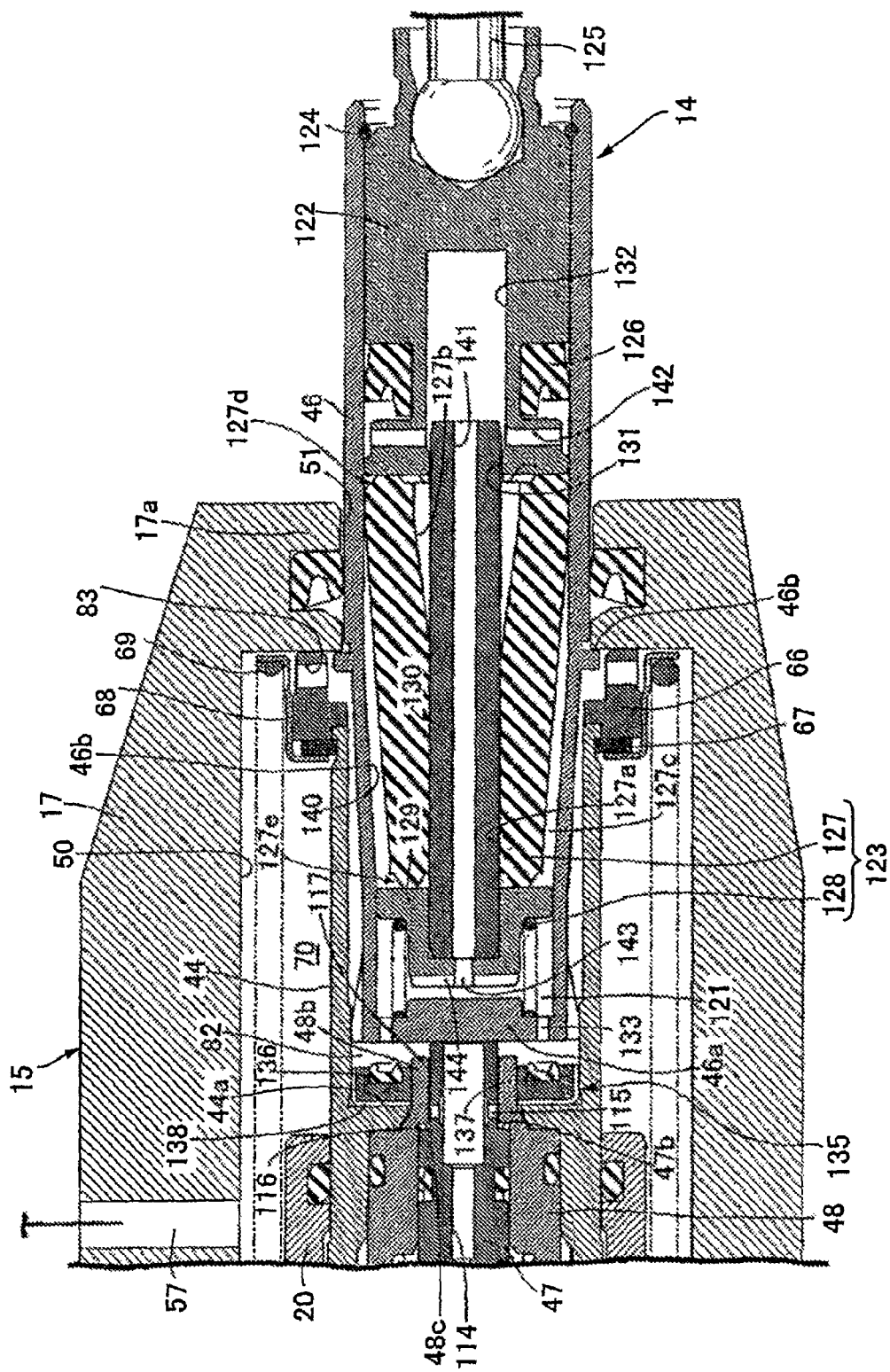
FIG. 4 is an enlarged vertical sectional view showing the stroke simulator.

Also referring to FIG. 4, the control piston 46 is formed into a bottomed cylindrical shape having an end wall 46a at its front end. The control piston 46 is fitted fluid-tightly and slidably into the small diameter hole 51 formed in the inward flange portion 17a at the rear end of the body 17 and inserted coaxially into the rear portion of the backup piston 44. In addition, a restricting protrusion 46b for restricting the retraction limit of the control piston 46 by making contact with and engaging with the inner circumferential fringe portion of the inward flange portion 17a from the front side is integrally provided so as to protrude around the entire circumference of the outer face of the control piston 46.

An open chamber 82 is formed between the backup piston 44 and the control piston 46 behind the inward flange portion 44a. This open chamber 82 communicates with the open chamber 70 via a through hole 83 provided in the stopper 66. In other words, the open chamber 82 communicates with the third fluid reserving chamber 31c of the reservoir 31 via the through hole 83, the open chamber 70 and the open port 57.

The rear end of the first reaction force piston 47 is made contact with the end wall 46a at the front end of the control piston 46 at all times. In addition, a spring 84 for exerting a biasing spring force so that the rear end of first reaction force piston 47 is made contact with the end wall 46a of the control piston 46 is accommodated in the pressure adjustment chamber 80 as shown in FIGS. 2 and 3. The spring force of this spring 84 is set very low.

Furthermore, an extension cylinder portion 48b coaxially surrounding the rear portion of the first reaction force piston 47 and inserted into the inner circumference of the inward flange portion 44a is integrally provided coaxially on the second reaction force piston 48. In a state in which the second reaction force piston 48 makes contact with the inward flange portion 44a of the backup piston 44 and is located at the retraction limit position, the rear end of the extension cylinder portion 48b of the second reaction force piston 48 is disposed ahead of the rear end of the first reaction force piston 47.

Hence, when the control piston 46 moves forward with respect to the backup piston 44, the first reaction force piston 47 moves forward together with the control piston 46, and the rear end of the second reaction force piston 48 makes contact with the end wall 46a at the front end of the control piston 46 when the braking operation input from the brake pedal has increased and the forward movement amount of the control piston 46 has reached a predetermined value or more.

Referring to FIG. 3 again, the boosting valve 42 includes first and second valve devices 87 and 88 arranged in the axial direction of the control piston 46 so as to open sequentially as the braking operation input from the brake pedal 11 increases. The sealing diameter of the second valve device 88 is set larger than the sealing diameter of the first valve device 87, and the second valve device 88 is configured so as to start to open before the flow rate from the first valve device 87 having opened becomes maximal.

The first valve device 87 includes a cylindrical sliding member 90 having a first valve seat 89 at its front end; a retainer 92 in which a valve chamber 91 communicating with the input chamber 78 leading to the fluid pressure source 12 is formed; a valve body 93 slidably fitted into the retainer 92 so as to be capable of being seated on the first valve seat 89 facing the interior of the valve chamber 91; a first valve spring 94 provided between the retainer 92 and the valve body 93 so as to bias the valve body 93 to seat the valve body 93 on the first valve seat 89; and a pushrod 95 interlockingly connected to the control piston 46 so as to be able to make contact with the valve body 93 and inserted into the sliding member 90 so as to be movable in the axial direction.

Furthermore, the second valve device 88 includes a valve portion 96 provided on the sliding member 90 serving as a component common to the first valve device 87; the stepped cylindrical valve seat member 79, into which the sliding member 90 is slidably fitted and at the front end of which a second valve seat 97 is provided; the retainer 92 serving as a component common to the first valve device 87; a second valve spring 98 provided between the retainer 92 and the sliding member 90 so as to bias the valve portion 96 to seat the valve portion 96 on the second valve seat 97; and the pushrod 95 serving as a component common to the first valve device 87.

The retainer 92 is installed on the outer circumference of the front end portion of the valve seat member 79 by press fitting. The valve chamber 91 facing the first valve seat 89 at the front end of the sliding member 90 and the second valve seat 97 at the front end of the valve seat member 79 is formed inside the retainer 92. The valve chamber 91 communicates with the input chamber 78 leading to the fluid pressure source 12.

The valve body 93 of the first valve device 87 includes a spherical body 100 fixed at the rear portion of a sliding member 99 that is slidably fitted into the front portion of the retainer 92, wherein the spherical body 100 can be seated on the first valve seat 89. In other words, the valve body 93 is slidably fitted into the retainer 92, and the first valve spring 94 is disposed between the front end portion of the retainer 92 and the sliding member 99 in a compressed state.

A first valve hole 103, the front end of which is open at the central portion of the first valve seat 89, and a sliding hole 104 having a diameter larger than that of the first valve hole 103, communicating with the first valve hole 103 at its front end and being open at its rear end are coaxially provided in the sliding member 90. On the other hand, a second valve hole 105, the front end of which is open at the central portion of the second valve seat 97, and a sliding hole 106 having the same diameter as that of the second valve hole 105, communicating with the second valve hole 105 at its front end and being open at its rear end are coaxially provided in the valve seat member 79. The sliding member 90 is movable along the second valve hole 105, passes through the second valve hole 105 coaxially and is slidably fitted into the sliding hole 106.

The pushrod 95 is slidably fitted into the sliding hole 104 of the sliding member 90 while the front end portion thereof is disposed inside the first valve hole 103. Inside the valve seat member 79, the pushrod 95 is integrally provided with a pushing flange portion 95a making contact with the rear end of the sliding member 90 and being capable of pushing and moving the sliding member 90 forward. A restricting flange portion 79a is integrally provided on the valve seat member 79 so as to extend inward in the radial direction from the inner face of the rear portion of the sliding hole 106, wherein the restricting flange portion 79a is intended to restrict the retraction limit of the pushrod 95 by making contact with the pushing flange portion 95 from behind.

A sliding portion 95b making slide contact with the inner face of the sliding hole 104 is provided on the pushrod 95 ahead of the pushing flange portion 95a. On the front side of this sliding portion 95b, the pushrod 95 is formed so as to be smaller in diameter so that a ring-shaped chamber 107 is formed between the pushrod 95 and the inner face of the sliding member 90.

Hence, when the valve body 93 is pushed using the front end of the pushrod 95 and moved away from the first valve seat 89, the valve chamber 91 communicates with the ring-shaped chamber 107. In addition, when the pushing flange portion 95a makes contact with the restricting flange portion 79a, the distance between the front end of the pushrod 95 and the valve body 93 is smaller than the distance between the rear end of the sliding member 90 and the pushing flange portion 95a. While the pushrod 95 is moved forward, when the pushrod 95 is further moved forward after the valve body 93 has been moved away from the first valve seat 89, the sliding member 90 is pushed forward by the pushing flange portion 95a.

The valve portion 96 of the second valve device is provided on the sliding member 90 behind the first valve seat 89 and can be seated on the second valve seat 97 while having a sealing diameter larger than the sealing diameter obtained when the valve body 93 is seated on the first valve seat 89. Hence, after the first valve device 87 has opened, the pushrod 95 is moved forward further to push the sliding member 90 forward, whereby the valve portion 96 is moved away from the second valve seat 97 and the second valve device 88 opens.

A plurality of flowing grooves 108, the rear ends of which are open at the rear end of the valve seat member 79, are provided in the inner face of the sliding hole 106 in the valve seat member 79. The sliding member 90 is provided with a plurality of through holes 109 for allowing the ring-shaped chamber 107 to communicate with the respective flowing grooves 108.

The rear portion of the pushrod 95 is inserted into the pressure adjustment chamber 80. Inside the pressure adjustment chamber 80, the pushrod 95 is slidably fitted into the central portion of a disc-shaped straightening member 110 for straightening the flow of the brake fluid from the first and second valve devices 87 and 88 to the pressure adjustment chamber 80. Hence, when the straightening member 110 makes contact with the face of the valve seat member 79 facing the pressure adjustment chamber 80, thereby being capable of closing the opening end of the sliding hole 106 to the pressure adjustment chamber 80.

A spring receiving member 111 is press-fitted onto the pushrod 95 and fixed thereto behind the straightening member 110, and a spring 112 is provided between the straightening member 110 and the spring receiving member 111 in a compressed state. On the other hand, the front end of the first reaction force piston 47 is also inserted into the pressure adjustment chamber 80 coaxially with the pushrod 95 as shown in FIG. 2. The spring 84 is provided between the front portion of the first reaction force piston 47 and the straightening member 110. Hence, the straightening member 110 is biased toward the valve seat member 79 by the spring forces of the springs 84 and 112. The spring forces of the springs 84 and 112 are set to the extent that the straightening member 110 can move away from the valve seat member 79 when the fluid pressure from the fluid pressure source 12 is exerted to the straightening member 110 by opening the first valve device 87 while the straightening member 110 is in a state of making contact with the face of the valve seat member 79 facing the pressure adjustment chamber 80.

The reducing valve 43 includes the rear end portion of the pushrod 95 and the front end portion of the first reaction force piston 47. The first reaction force piston 47 is coaxially provided with a valve hole 113 being open at the front end of the first reaction force piston 47 and closed when the rear end portion of the pushrod 95 makes contact with the front end portion of the first reaction force piston 47 and an open path 114 formed to have a diameter larger than that of the valve hole 113, wherein the front end of the open path 114 is allowed to communicate with the valve hole 113, and the open path 114 extends to the rear end of the first reaction force piston 47. Since the end wall 46a at the front end of the control piston 46 makes contact with the rear end of the first reaction force piston 47 at all times, the rear end of the open path 114 is closed substantially.

As shown in FIG. 4, a plurality of through holes 115 for allowing the inner ends thereof to communicate with the open path 114 are provided in the intermediate portion of the first reaction force piston 47. When the rear end portion of the pushrod 95 is moved away from the front end portion of the first reaction force piston 47 and the valve hole 113 is opened, the reducing valve 43 is opened. At this time, the operating fluid from the open path 114 flows into the open chamber 82 via the through holes 115, a primary reserving chamber 116 and an orifice 117.

The primary reserving chamber 116 is formed between the first and second reaction force pistons 47 and 48 and is formed into a ring shape so as to surround the first reaction force piston 47 between a ring-shaped step portion 47b facing backward and provided on the outer circumference of the first reaction force piston 47 and a ring-shaped step portion 48c facing forward and provided on the inner circumference of the second reaction force piston 48 so as to be opposed to the step portion 47b. In addition, the through holes 115 are provided in the first reaction force piston 47 so that the through holes 115 are located at positions corresponding to the primary reserving chamber 116 at least when the reducing valve 43 starts to open from its closed state.

The orifice 117 is formed between the outer circumference of the rear end portion of the first reaction force piston 47 and the inner circumference of the extension cylinder portion 48b of the second reaction force piston 48. The orifice 117 is formed by setting a ring-shaped clearance between the outer circumference of the rear portion of the first reaction force piston 47 and the inner circumference of the extension cylinder portion 48b amounting to the difference in diameter.

In the fluid pressure booster 13 configured as described above, the braking operation input from the brake pedal 11 is input to the control piston 46 via the stroke simulator 14, and a pushing force is exerted forward from the control piston 46 to the first reaction force piston 47. Hence, when the forward movement amount of the control piston 46 with respect to the backup piston 44 is less than the predetermined value, only the first reaction force piston 47 makes contact with the control piston 46. As the first reaction force piston 47 moves forward, the reducing valve 43 is closed, and the communication between the pressure adjustment chamber 80 and the open chamber 82 is shut off, and the control piston 46, the first reaction force piston 47 and the pushrod 95 move further forward. In the boosting valve 42, as the pushrod 95 moves forward, first, the first valve device 87 is opened and then the second valve device 88 is opened.

When the reducing valve 63 is in its closed state, the fluid pressure of the pressure adjustment chamber 80 is applied to the front end of the first reaction force piston 47. The first reaction force piston 47 and the control piston 46 move backward so that the braking operation input from the brake pedal 11 is balanced with the fluid pressure force based on the fluid pressure of the pressure adjustment chamber 80, whereby the reducing valve 43 opens and the boosting valve 42 closes. The opening and closing operations of the boosting valve 42 and the reducing valve 43 are repeated, whereby the output fluid pressure of the fluid pressure source 12 is adjusted to the boosted fluid pressure corresponding to the braking operation input from the brake pedal 11 and applied to the pressure adjustment chamber 80. If the movement amount of the control piston 46 with respect to the backup piston 44 in the forward direction becomes the predetermined value or more, not only the first reaction force piston 47 but also the second reaction force piston 48 makes contact with the control piston 46, and the fluid pressure force for pushing the second reaction force piston 48 backward by virtue of the fluid pressure of the input chamber 78 and the spring force of the reaction spring 77 are also applied as a reaction force. As a result, the reaction force exerted to the control piston 46 increases.

Referring to FIG. 4, the stroke simulator 14 is equipped with a simulator piston 122 fluid-tightly fitted into the control piston 46 so as to be slidable in the axial direction while forming a stroke fluid chamber 121 between the simulator piston 122 and the end wall 46a at the front end of the control piston 46; and an elastic device 123 accommodated in the stroke fluid chamber 121 so as to be disposed between the simulator piston 122 and the end wall 46a of the control piston 46. The stroke simulator 14 is built into the control piston 46.

The simulator piston 122 is slidably fitted into the rear portion of the control piston 46 so that the retraction limit position thereof is restricted using a retaining ring 124 mounted on the rear end portion of the control piston 46, and the front end portion of an input rod 125 serving as an input member connected to the brake pedal 11 is swingably connected to the simulator piston 122. In other words, the brake operation force in response to the operation of the brake pedal 11 is input to the simulator piston 122 via the input rod 125, and the simulator piston 122 moves forward in response to the input of the brake operation force. In addition, a ring-shaped sealing member 126 making slide contact with the inner circumference of the control piston 46 is mounted on the outer circumference of the simulator piston 122.

The elastic device 123 includes an elastic member 127 made of an elastic material, such as rubber, and formed into a cylindrical shape and a coil spring 128 (a spring) made of metal and having a spring load being set smaller than the load of the elastic member 127, and the elastic member 127 and the coil spring 128 are connected in series via a sliding member 129 slidably accommodated in the control piston 46. The elastic member 127 is disposed between the sliding member 129 and the simulator piston 122, and the coil spring 128 is disposed between the end wall 46a at the front end of the control piston 46 and the sliding member 129.

Furthermore, the elastic member 127 and the coil spring 128 are disposed in series between the simulator piston 122 and the control piston 46, wherein in the initial stage of the braking operation of the brake pedal 11, the spring force exerted from the coil spring 128 is applied to the control piston 46, and the action of the spring force of the coil spring 128 to the control piston 46 is completed when the sliding member 129 makes contact with the end wall 46a at the front end of the control piston 46, and then the elastic deformation of the elastic member 127 starts.

Moreover, the load set to the coil spring 128 is set so as to deliver a spring force in the front-back direction and to be smaller than the load set to another spring member connected in series with the coil spring 128. In the first embodiment, the load set to the coil spring 128 is set smaller than that of the spring 84 that is accommodated in the pressure adjustment chamber 80 and connected in series with the coil spring 128 via the first reaction force piston 47 and the end wall 46a of the control piston 46.

The front end portion of a guide shaft 130 provided coaxially with the control piston 46 and passing through the elastic member 127 is press-fitted into the central portion of the sliding member 129, and the rear end portion of this guide shaft 130 is slidably fitted into the simulator piston 122. In other words, a sliding hole 131 into which the rear end portion of the guide shaft 130 is slidably fitted and a bottomed hole 132 which has a diameter larger than that of the sliding hole 131, the front end of which is connected to the rear portion of the sliding hole 131 and the rear end of which is closed, are provided coaxially at the central portion of the simulator piston 122. The rear end portion of the guide shaft 130 is inserted into the bottomed hole 132 as the simulator piston 122 moves forward relatively with respect to the guide shaft 130.

In the end wall 46a at the front end of the control piston 46, a plurality of openings 133 for allowing the open chamber 82 facing the front face of the end wall 46a to communicate with the stroke fluid chamber 121 are provided at the same distance from the center of the control piston 46, whereby the stroke fluid chamber 121 inside the control piston 46 communicates with the open chamber 82 when the openings 133 are open.

When the control piston 46 has moved forward by a predetermined forward stroke or more, the openings 133 are closed by the seat stopper 135 fixed to the backup piston 44. The seat stopper 135 includes a retainer 136, the outer circumference of which is press-fitted into the inner circumference of the backup piston 44 so that the retainer 136 is fixed to the backup piston 44 so as to make contact with the inward flange portion 44a, and an elastic sealing member 137 retained in the retainer 136.

The retainer 136 is made of a material having rigidity, such as metal, and formed into a ring shape. The retainer 136 is press-fitted into the backup piston 44 so that a minute ring-shaped clearance is formed between the retainer 136 and the extension cylinder portion 48b of the second reaction force piston 48.

The elastic sealing member 137 is formed so as to make contact with the front face of the end wall 46a on the inner and outer sides of the openings 133 of the control piston 46 in the radial direction and to close the openings 133 and is bonded to the retainer 136 by baking.

In addition, on the rear face of the retainer 136, a through groove 138 for allowing the inward side of the retainer 136 to communicate with the outside portion of the control piston 46 in the open chamber 82 is provided in a state in which the end wall 46a of the control piston 46 makes contact with the elastic sealing member 137.

In other words, in the state in which the end wall 46a of the control piston 46 has made contact with the elastic sealing member 137, the extension cylinder portion 48b of the second reaction force piston 48 also makes contact with the end wall 46a. Hence, the space between the retainer 136 and the extension cylinder portion 48b communicates with the outside portion of the control piston 46 in the open chamber 82 via the minute clearance and the through groove 138. In the state in which the end wall 46a of the control piston 46 makes contact with the elastic sealing member 137, the pressure in the space located inward from the elastic sealing member 137 and faced by the rear portion of the retainer 136 does not become negative but is maintained at atmospheric pressure as the control piston 46 moves backward.

The control piston 46 is formed into a bottomed cylindrical shape being tapered such that the diameter of a part of the inner circumferential face thereof becomes smaller forward. In the first embodiment, the control piston 46 has a tapered face 140, wherein a part of the inner circumferential face of the control piston 46 has a diameter becoming smaller forward on the front side from the simulator piston 122. The front half portion of the control piston 46 is formed as a tapered cylinder portion 46b, the inner circumferential face of which serves as the tapered face 140. The sliding member 129 is slidably accommodated inside the control piston 46 on the front side from the tapered face 140.

Figure 5:
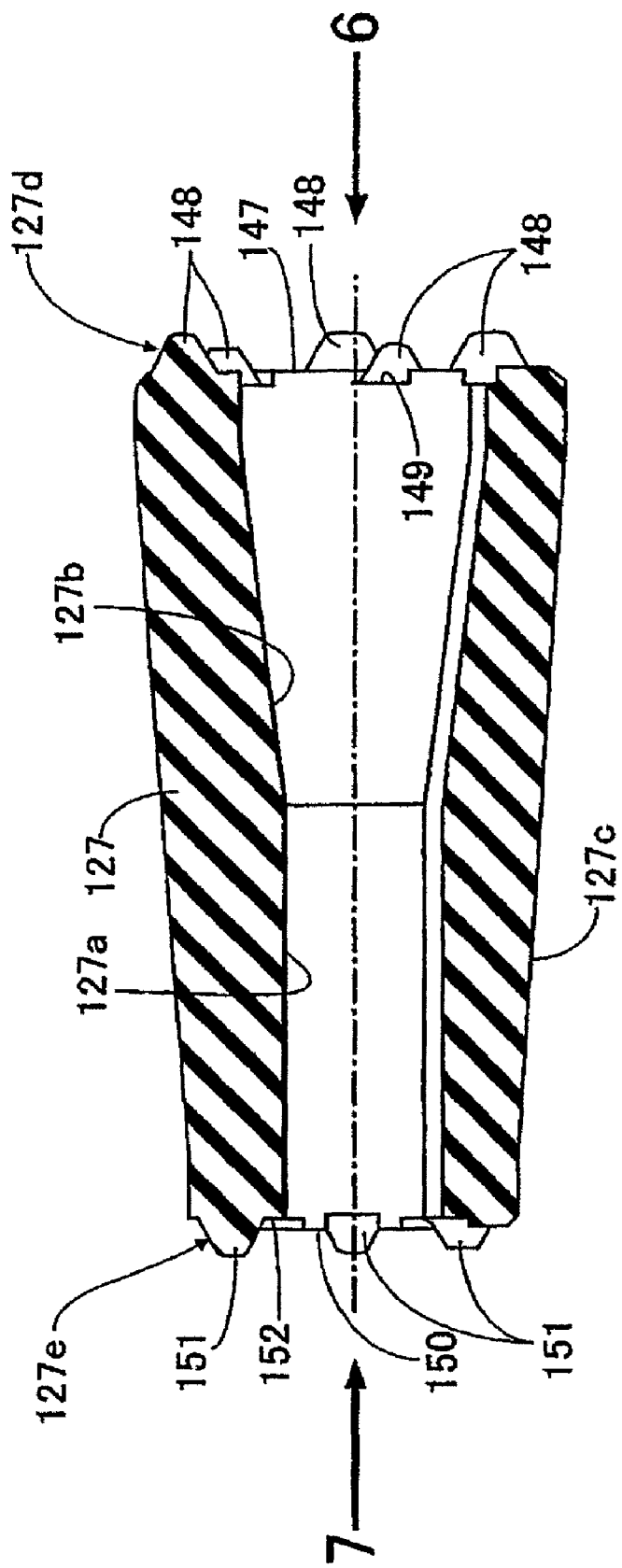
FIG. 5 is a vertical sectional view showing an elastic member.

Also referring to FIG. 5, the elastic member 127 disposed between the sliding member 129 and the simulator piston 122 is formed into a cylindrical shape, wherein the elastic member 127 is elastically deformed by the action of the axial compression force exerted as the simulator piston 122 moves forward, and the deformation is stopped by the restriction using the control piston 46 as the axial compression force increases. In a natural state in which no load is applied, the elastic member 127 is formed so that at least a part of the inner circumferential face thereof has a tapered face. Hence, in the first embodiment, the elastic member 127 is formed so that the inner circumferential face of the elastic member 127 being in the no-load state has a cylindrical face 127a provided at the front half thereof and having an inside diameter equal to the outside diameter of the guide shaft 130 so as to allow the guide shaft 130 to pass through and a tapered face 127b having a diameter becoming larger backward away from the outer face of the guide shaft 130.

Furthermore, at least a part of the outer circumferential face of the elastic member 127 is formed into an outer circumferential tapered face 127c having a diameter becoming larger toward the simulator piston 122. In the first embodiment, the elastic member 127 is formed so that almost the entire length of the outer circumferential face thereof, except for a part close to the rear portion of the elastic member 127, is formed into the outer circumferential tapered face 127c in a natural state in which no load is applied.

Moreover, an odd-shaped portion being formed so that its area making contact with at least one of the simulator piston 122 and the sliding member 129 increases as compression is applied in the axial direction is provided at least at one of both end portions of the elastic member 127 in the axial direction. In the first embodiment, an odd-shaped portion 127d making contact with the simulator piston 122 is provided on the rear end portion of the elastic member 127, and an odd-shaped portion 127e making contact with the sliding member 129 is provided on the front end portion of the elastic member 127.

Figure 6:
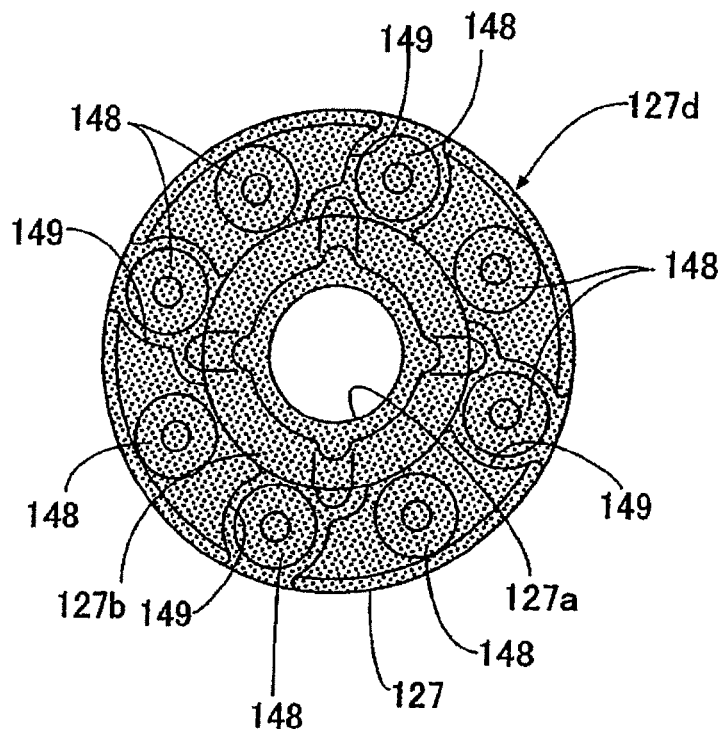
FIG. 6 is a view taken from arrow 6 in FIG. 5.

Also referring to FIG. 6, the odd-shaped portion 127d provided on the rear end portion of the elastic member 127 so as to make contact with the simulator piston 122 is formed of a plurality of protrusions 148 spaced at equal intervals, eight pieces for example, and protruding from a ring-shaped flat face 147. The protrusions 148 are formed into a circular truncated cone shape having a diameter becoming smaller toward the simulator piston 122. Furthermore, groove-shaped concave portions 149 are formed in the flat face 147 around the four protrusions 148 spaced at equal intervals in the circumferential direction among the eight protrusions 148.

Figure 7:
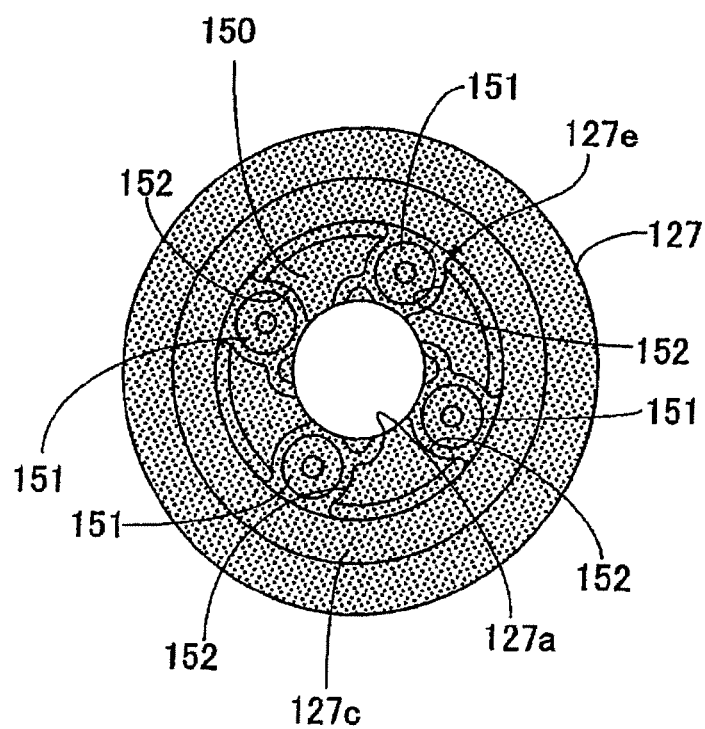
FIG. 7 is a view taken from arrow 7 in FIG. 5.

Also referring to FIG. 7, the odd-shaped portion 127e provided on the front end portion of the elastic member 127 so as to make contact with the sliding member 129 is formed of a plurality of protrusions 151 spaced at equal intervals, four pieces for example, and protruding from a ring-shaped flat face 150. The protrusions 151 are formed into a circular truncated cone shape having a diameter becoming smaller toward the sliding member 129. Furthermore, groove-shaped concave portions 152 are formed in the flat face 150 around the four protrusions 151.

The guide shaft 130, the rear end portion of which is fitted into and supported by the simulator piston 122, is formed into a cylindrical shape while coaxially having an open path 141 extending along its entire length in the axial direction. In the front portion of the simulator piston 122, ahead of the portion on which the sealing member 126 is mounted, a plurality of paths 142, the inner ends of which are open to the bottomed hole 132 communicating with the open path 141, are provided along the radial direction of the simulator piston 122. Hence, the paths 142 and the bottomed hole 132 allow the space between the elastic member 127 and the control piston 46 in the stroke fluid chamber 121 to communicate with the open path 141 of the guide shaft 130.

In addition, the sliding member 129 is provided with an open path 143 coaxially communicating with the front end of the open path 141. Furthermore, in the front end face of the sliding member 129, a plurality of grooves 144 are provided in the radial direction to prevent the open path 143 from being clogged by the end wall 46a when the sliding member 129 makes contact with the end wall 46a at the front end of the control piston 46.

With this configuration, until the openings 133 are closed by the seat stopper 135 and the stroke fluid chamber 121 becomes a fluid pressure locking state while the control piston 46 moves forward, the space between the elastic member 127 and the control piston 46 inside the control piston 46 communicates with the open chamber 82 via the paths 142, the bottomed hole 132, the open paths 141 and 143, the grooves 144 and the openings 133. In other words, the space between the elastic member 127 and the control piston 46 is allowed to communicate with the open chamber 82, i.e., the reservoir 31, in the forward stroke of the control piston 46 until the operating fluid is tightly sealed inside the control piston 46.

Next, the operation of the first embodiment will be described below. The stroke simulator 14 for obtaining the operation stroke feeling of the brake pedal 11 is provided between the fluid pressure booster 13 and the brake pedal 11. The stroke simulator 14 is equipped with the simulator piston 122 accommodated in the cylindrical control piston 46 constituting a part of the fluid pressure booster 13 so as to be slidable in the axial direction and connected to the brake pedal 11; the cylindrical elastic member 127 made of rubber, accommodated in the control piston 46 between the simulator piston 122 and the control piston 46, and formed into a cylindrical shape so as to elastically make contact with the inner circumference of the control piston 46 when deflected by the compression force of the simulator piston 122 applied thereto in the axial direction as the simulator piston 122 moves forward; and the guide shaft 130 inserted into the elastic member 127 so as to guide the simulator piston 122 inside the control piston 46 in the axial direction and to restrict the deflection of the elastic member 127 in the radial direction. In the no-load state, the elastic member 127 is formed so that at least a part of the inner circumferential face thereof has a tapered face 127b. In the first embodiment, the elastic member 127 is formed so that the inner circumferential face of the elastic member 127 being in the no-load state has the cylindrical face 127a provided at the front half thereof having an inside diameter equal to the outside diameter of the guide shaft 130 so as to allow the guide shaft 130 to pass through and the tapered face 127b having a diameter becoming larger backward away from the outer face of the guide shaft 130.

Because of the shape of the elastic member 127 described above, even if the brake operation force exerted from the brake pedal 11 becomes large, deformation occurs on the side of the tapered face 127b of the elastic member 127 and the inside space is filled with the elastic member 127 gradually. Hence, the distortion on the inner circumference side of the elastic member 127 that is pressed to the guide shaft 130 can be prevented from becoming large. As a result, the elastic member can prevent the operation feeling of the braking apparatus from lowering and can contribute to the improvement in the durability of the braking apparatus.

Figure 8:
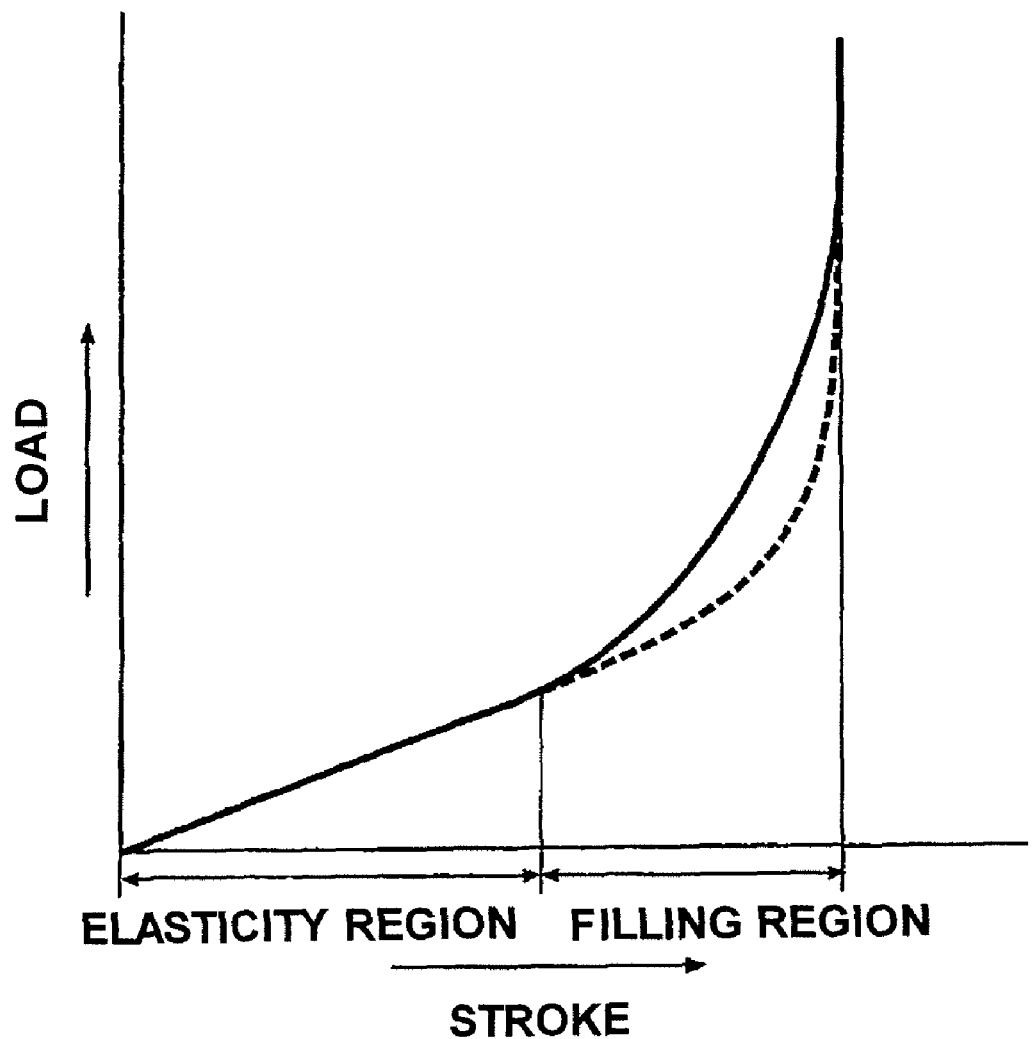
FIG. 8 is a characteristic diagram showing the relationship between the operation load and stroke of the stroke simulator.

The relationship between the stroke and the load at the stroke simulator 14 changes as indicated by the solid line shown in FIG. 8. On the other hand, in the conventional case in which the elastic member has no tapered face on the inner circumference thereof, the relationship between the stroke and the load is indicated by the broken line shown in FIG. 8. The characteristic in the elasticity region in which the elastic member 127 is deflected elastically between the control piston 46 and the guide shaft 130 is similar to that in the elasticity region in the conventional case. However, in the filling region in which the elastic member 127 is restrained by the control piston 46 and the elastic member 127 is prevented from being deformed to the outer circumference thereof, room is provided to allow the elastic member 127 to be deflected inward in the radial direction. Hence, the distortion on the inner circumference side of the elastic member 127 can be prevented from becoming large, and the change in the load can be made larger than that in the conventional case. As a result, the elastic member can prevent the operation feeling of the braking apparatus from lowering and can contribute to the improvement in the durability of the braking apparatus.

Furthermore, since at least a part of the outer circumferential face of the elastic member 127 is formed into the outer circumferential tapered face 127c having a diameter becoming larger toward the simulator piston 122, the outer circumference of the rear portion of the elastic member 127 can be made contact with the inner circumference of the control piston 46 in an early stage, and the sliding resistance generated can be utilized as the reaction force of the brake pedal 11. Moreover, since the filling effect of the elastic member 127 inside the control piston 46 is exerted early, the operation feeling can be improved in the region in which the brake operation force is large.

Still further, since a part of the inner circumferential face of the control piston 46 is formed into a tapered shape such that the diameter thereof becomes smaller forward, the deformation of the front portion of the elastic member 127 can be restricted in an early stage, and the operation feeling can be improved.

Figure 9:
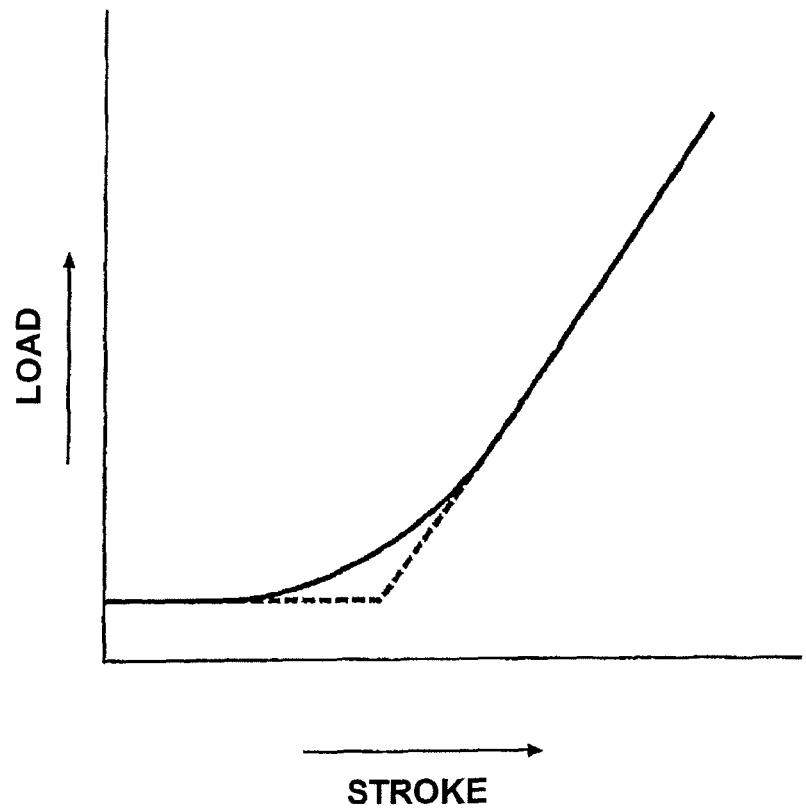
FIG. 9 is a characteristic diagram showing the relationship between the operation load and stroke of the stroke simulator in the initial stage of the stroke.

In addition, the odd-shaped portion being formed so that its area making contact with at least one of the simulator piston 122 and the sliding member 129 increases as compression is applied in the axial direction is provided at least at one of both end portions of the elastic member 127 in the axial direction. In the first embodiment, the odd-shaped portion 127d making contact with the simulator piston 122 is provided on the rear end portion of the elastic member 127, and the odd-shaped portion 127e making contact with the sliding member 129 is provided on the front end portion of the elastic member 127. Hence, when the contact areas of the elastic member 127 making contact with the sliding member 129 and the simulator piston 122 are unchanged in the initial stage of the stroke, an excessive difference occurs in characteristic in the transfer stage from the spring region to the elastic member region as indicated by the broken line shown in FIG. 9. However, the transfer stage from the spring region to the elastic member region can be carried out smoothly as indicated by the solid line as shown in FIG. 9 by changing the contact areas of the elastic member 127 making contact with the sliding member 129 and the simulator piston 122 in the initial stage of the stroke. Hence, the characteristic in the initial stage by means of the stroke simulator 14 can be changed as desired by the setting of the odd-shaped portions 127d and 127e, and the feeling of the braking operation stroke in the initial stage can be enhanced.

Furthermore, since the odd-shaped portions 127d and 127e are formed of the protrusions 148 and 151 protruding from the flat faces 147 and 150, respectively, the characteristic in the initial stage can be changed easily by changing the shapes of the protrusions 148 and 151. Moreover, since the pluralities of the protrusions 148 and 151 are protruded from the flat faces 147 and 150, respectively, the characteristic in the initial stage can be changed more easily by changing the numbers of the protrusions 148 and 151.

Still further, in the odd-shaped portion 127d, the groove-shaped concave portions 149 are formed in the flat face 147 around the four protrusions 148 spaced at equal intervals in the circumferential direction among the eight protrusions 148, and in the odd-shaped portion 127e, the groove-shaped concave portions 152 are formed in the flat face 150 around all the four protrusions 151. Hence, the distortions caused by the deformations of the protrusions 148 and 151 can be reduced by relieving parts of the protrusions into the concave portions 149 and 152, and the operation feeling can be improved further. In addition, the groove-shaped concave portions 149 can be used as paths for the brake fluid. When the protrusions 148 and 151 are deformed, the brake fluid can be discharged rapidly from both end portions of the elastic member 127 and from between the simulator piston 122 and the sliding member 129.

Figure 10:
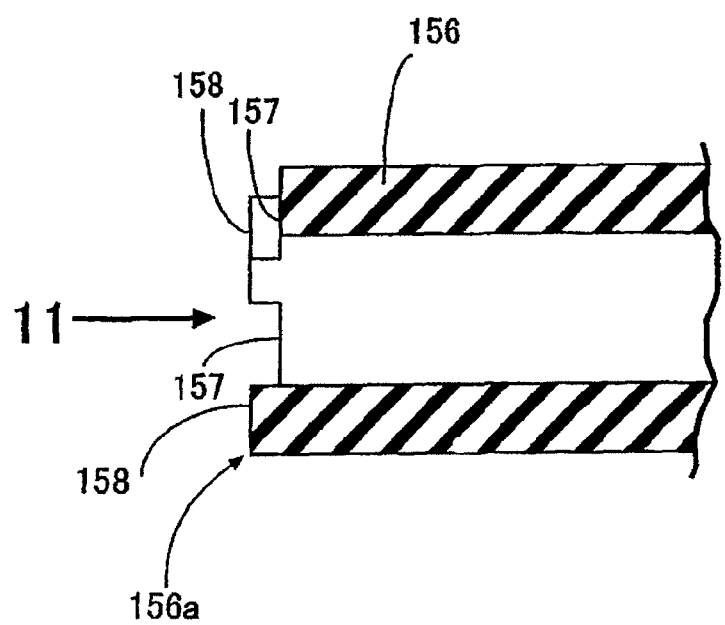
FIG. 10 is a vertical sectional view showing an end portion of an elastic member according to another aspect of the invention.
Figure 11:
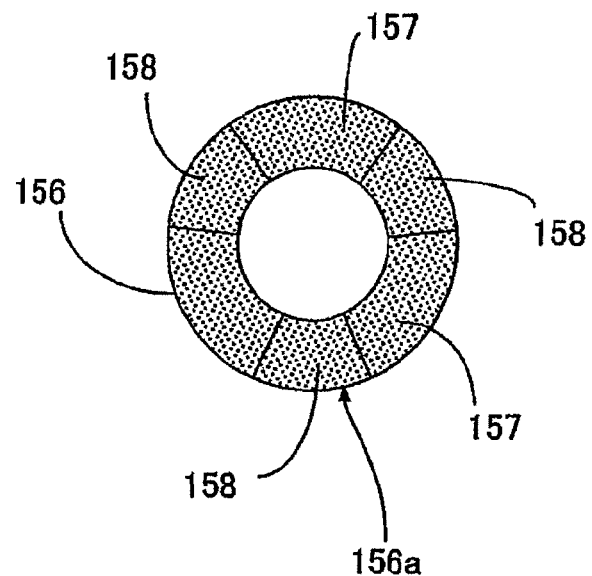
FIG. 11 is a view taken from arrow 11 in FIG. 10.

A second embodiment of the present invention will be described below referring to FIGS. 10 and 11. An odd-shaped portion 156a being formed so that its area making contact with at least one of the simulator piston 122 (refer to the first embodiment) and the sliding member 129 (refer to the first embodiment) increases as compression is applied in the axial direction is provided at the end portions of an elastic member 156 having a cylindrical shape. This odd-shaped portion 156a is formed of a plurality of protrusions 158, three pieces for example, protruding from a ring-shaped flat face 157. The protrusions 158 are disposed in the radial direction of the elastic member 156 so that the widths thereof extend toward the outer circumference of the elastic member 156.

According to the second embodiment, as in the case of the first embodiment, the characteristic in the initial stage by means of the stroke simulator 14 can be changed as desired by the setting of the odd-shaped portion 156a, and the feeling of the braking operation stroke in the initial stage can be enhanced. Furthermore, the characteristic in the initial stage can be changed more easily by changing the shape and number of the protrusions 158.

Figure 12:
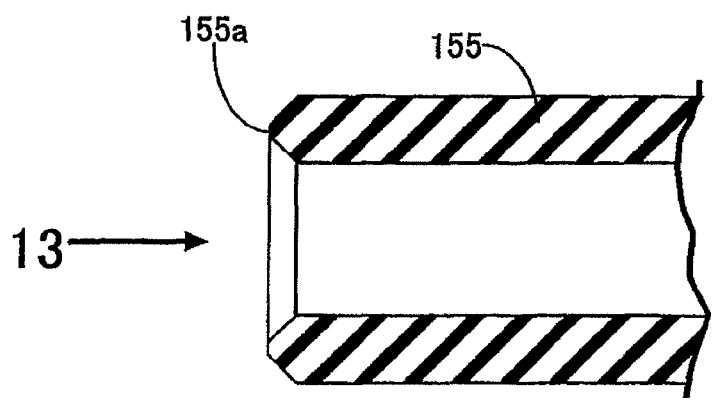
FIG. 12 is a vertical sectional view showing an end portion of an elastic member according to still another aspect of the invention.
Figure 13:
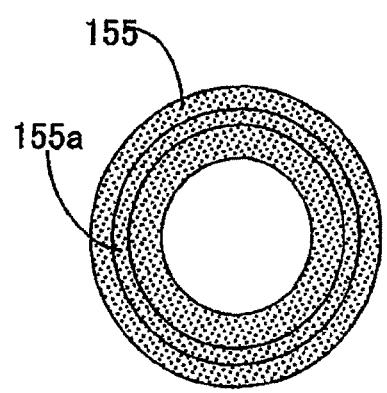
FIG. 13 is a view taken from arrow 13 in FIG. 12.

A third embodiment of the present invention will be described below referring to FIGS. 12 and 13. An odd-shaped portion 155a being formed so that its area making contact with at least one of the simulator piston 122 (refer to the first embodiment) and the sliding member 129 (refer to the first embodiment) increases as compression is applied in the axial direction is provided at the end portions of an elastic member 155 having a cylindrical shape. This odd-shaped portion 155*a* is formed into a ring shape so that its width becomes smaller toward the tip end by forming both the inner circumference and outer circumference thereof into a tapered shape.

Also according to the third embodiment, the characteristic in the initial stage by means of the stroke simulator 14 can be changed as desired by the setting of the odd-shaped portion 155*a*, and the feeling of the braking operation stroke in the initial stage can be enhanced. Furthermore, the formability of the elastic member 155 can be enhanced by simplifying the shape of the end portions of the elastic member 155.

Figure 14:
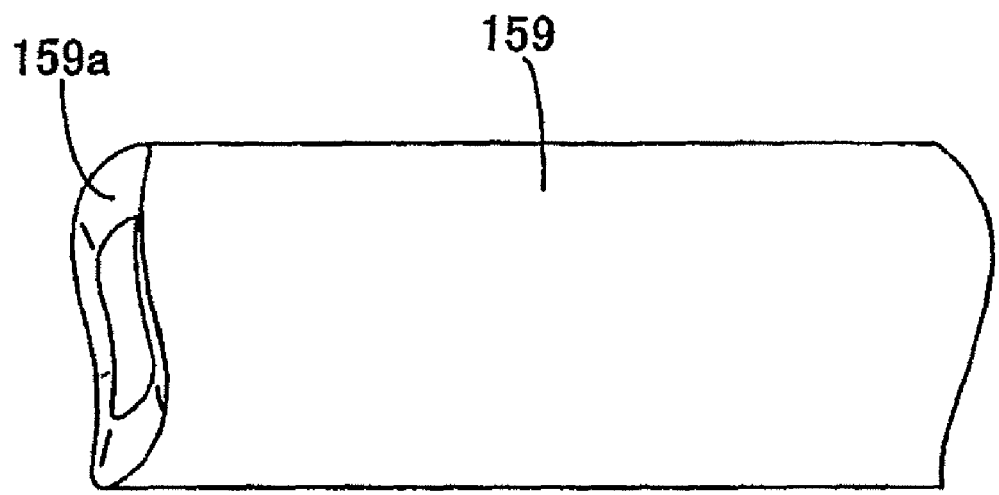
FIG. 14 is a vertical sectional view showing an end portion of an elastic member according to still another aspect of the invention.

A fourth embodiment of the present invention will be described below referring to FIG. 14. An odd-shaped portion 159*a* being formed so that its area making contact with at least one of the simulator piston 122 (refer to the first embodiment) and the sliding member 129 (refer to the first embodiment) increases as compression is applied in the axial direction is provided at the end portions of an elastic member 159 having a cylindrical shape. This odd-shaped portion 159*a* is formed into an undulating shape in the circumferential direction of the elastic member 159.

Also according to the fourth embodiment, as in the cases of the first embodiment to the third embodiment, the characteristic in the initial stage by means of the stroke simulator 14 can be changed as desired by the setting of the odd-shaped portion 159*a*, and the feeling of the braking operation stroke in the initial stage can be enhanced. Furthermore, the formability of the elastic member 159 can be enhanced by simplifying the shape of the end portions of the elastic member 159.

Although the embodiments according to the present invention have been described above, the present invention is not limited to the above-mentioned embodiments, and various design changes can be made without departing from the scope of the present invention as set forth in the appended claims.

What is claimed is:

1. A vehicle braking apparatus, disposed between a brake operation member and a fluid pressure booster configured to apply a fluid pressure to a boosted fluid pressure application chamber, the vehicle braking apparatus comprising:
 a control piston having a cylindrical shape, the control piston configured to operate so that a reaction force based on the fluid pressure of the boosted fluid pressure application chamber is balanced with a braking operation input from the brake operation member, the boosted fluid pressure application chamber facing a rear face of a master piston disposed in a master cylinder;
 an elastic member having a cylindrical shape, the elastic member including: a first face adapted to contact with a simulator piston connected to the brake operation member and slidably accommodated in the control piston in an axial direction; and a second face;
 a sliding member adapted to contact with the second face, the sliding member being accommodated in the control piston;
 a spring disposed between the sliding member and the control piston; and
 an odd-shaped portion disposed on at least one of the first and second faces of the elastic member, the odd-shaped portion configured to increase a contacting area of the elastic member and at least one of the simulator piston and the sliding member as compression is applied in the axial direction.

2. The vehicle braking apparatus according to claim 1, wherein the odd-shaped portion including a protrusion portion and a flat face, the protrusion portion including at least one protrusion protruded from the flat face.

3. The vehicle braking apparatus according to claim 2, wherein the protrusion portion including a plurality of protrusions protruded from the flat face.

4. The vehicle braking apparatus according to claim 2, wherein the odd-shaped portion including a concave portion formed in the flat face around the protrusion.

5. The vehicle braking apparatus according to claim 1, wherein the elastic member is comprised of rubber.

6. The vehicle braking apparatus according to claim 1, wherein the spring and the elastic member are connected in series via the sliding member slidably accommodated in the control piston.

7. The vehicle braking apparatus according to claim 6, wherein the elastic member is disposed between the sliding member and the simulator piston, and the spring is disposed between an end wall at the front end of the control piston and the sliding member.

8. The vehicle braking apparatus according to claim 1, wherein the elastic member is elastically deformed by action of an axial compression force exerted as the simulator piston moves forward, and deformation is stopped by restriction using the control piston as the axial compression force increases.

9. The vehicle braking apparatus according to claim 1, wherein the elastic member is formed so that at least a part of an inner circumferential face thereof has a tapered face.

10. The vehicle braking apparatus according to claim 9, wherein the elastic member is formed so that the inner circumferential face, in a no-load state, has a cylindrical face provided at a front half thereof and has an inside diameter equal to an outside diameter of a guide shaft so as to allow the guide shaft to pass through, and a tapered face having a diameter becoming larger, behind the front half, such that it does not contact an outer circumferential face of the guide shaft.

11. The vehicle braking apparatus according to claim 10, wherein at least a part of an outer circumferential face of the elastic member is formed into an outer circumferential tapered face having a diameter which is larger toward the simulator piston.

12. The vehicle braking apparatus according to claim 1, wherein the elastic member is formed so that almost an entire length of an outer circumferential face thereof, except for a part close to a rear portion thereof, is formed into an outer circumferential tapered face when no load is applied.

13. The vehicle braking apparatus according to claim 1, wherein the odd-shaped portion is provided at both the first face and the second face of the elastic member such that the odd-shaped portion makes contact with both the simulator piston and the sliding member and a contact surface increases as compression is applied in an axial direction provided at least at one of both end portions of the elastic member.

14. The vehicle braking apparatus according to claim 1, wherein the odd-shaped portion is a plurality of protrusions spaced at equal intervals around a circumference of the first face, contacting the simulator piston, and protruding from a ring-shaped flat face.

15. The vehicle braking apparatus according to claim 14, wherein the plurality of protrusions are formed into a circular truncated cone shape having a diameter becoming smaller toward the simulator piston.

16. The vehicle braking apparatus according to claim 15, further comprising groove-shaped concave portions formed in the ring-shaped flat face around four protrusions spaced at equal intervals in a circumferential direction among eight protrusions.

17. The vehicle braking apparatus according to claim 14, wherein the odd-shaped portion is a plurality of protrusions spaced at equal intervals around an inner circumference of the second face so as to make contact with the sliding member.

18. The vehicle braking apparatus according to claim 17, wherein the plurality of protrusions of the second face are protruding from the ring-shaped flat face.

19. The vehicle braking apparatus according to claim 18, wherein the plurality of protrusions of the second face are formed into a circular truncated cone shape having a diameter becoming smaller toward the sliding member.

20. The vehicle braking apparatus according to claim 19, further comprising groove-shaped concave portions formed in the ring-shaped flat face of the elastic member around four protrusions.

* * * * *